United States Patent
Schulte et al.

(10) Patent No.: US 11,602,796 B2
(45) Date of Patent: Mar. 14, 2023

(54) INDEXABLE TANGENTIAL RAILWAY WHEEL MILLING INSERTS AND CUTTING TOOL HOLDERS

(71) Applicants: Kennametal Inc., Latrobe, PA (US); Simmons Machine Tool Corporation, Albany, NY (US)

(72) Inventors: Michael J. Schulte, Latrobe, PA (US); Christopher Johnson, Melrose, NY (US)

(73) Assignees: Kennametal Inc., Latrobe, PA (US); NSH USA Corporation, Albany, NY (US)

( * ) Notice: Subject to any disclaimer, the term of this patent is extended or adjusted under 35 U.S.C. 154(b) by 129 days.

(21) Appl. No.: 16/993,898

(22) Filed: Aug. 14, 2020

(65) Prior Publication Data
US 2022/0048120 A1 Feb. 17, 2022

(51) Int. Cl.
| B23C 5/02 | (2006.01) |
| B23C 5/08 | (2006.01) |
| B23C 5/20 | (2006.01) |
| B23F 21/16 | (2006.01) |
| B23C 5/22 | (2006.01) |
| B23F 21/14 | (2006.01) |

(52) U.S. Cl.
CPC ............... *B23C 5/08* (2013.01); *B23C 5/202* (2013.01); *B23C 5/205* (2013.01); *B23C 5/22* (2013.01); *B23F 21/146* (2013.01); *B23F 21/166* (2013.01)

(58) Field of Classification Search
CPC .. B23C 5/12; B23C 5/202; B23C 5/22; B23C 2215/36; B23C 3/02; B23C 2200/367; B23C 2200/203; B23C 2200/205; B23C 2210/242; B23C 2210/168
See application file for complete search history.

(56) References Cited

U.S. PATENT DOCUMENTS

| 2,645,003 A | 7/1953 | McQuiddy et al. |
| 3,540,103 A | 11/1970 | Saari |
| 3,598,017 A | 8/1971 | Saari |
| 4,569,619 A | 2/1986 | Newton |
| 4,597,143 A | 7/1986 | Dombrowski |
| 4,789,273 A | 12/1988 | Wiacek et al. |
| 5,678,966 A | 10/1997 | Heimann |

(Continued)

FOREIGN PATENT DOCUMENTS

WO WO-2017221232 A1 * 12/2017 ............... B23C 5/06

OTHER PUBLICATIONS

International Search Report and Written Opinion for International Application No. PCT/US2021/045952, dated Dec. 1, 2021, 10 Pages.

*Primary Examiner* — Alan Snyder
(74) *Attorney, Agent, or Firm* — Larry R. Meenan

(57) ABSTRACT

Railway wheel milling tool system including a railway wheel truing cutters and tangential railway wheel milling inserts are disclosed. The tangential milling inserts have at least four indexable cutting edges, each with a central wiper cutting edge segment between two convex cutting edge segments. The milling inserts may allow both the flat portion and curved portion of a railway wheel to be machined with an improved surface finish. The railway wheel truing cutters comprise a plurality of insert pockets structured and arranged to receive the tangential railway wheel milling inserts.

16 Claims, 8 Drawing Sheets

(56) References Cited

U.S. PATENT DOCUMENTS

| | | | |
|---|---|---|---|
| 5,890,854 A | 4/1999 | Naumann et al. | |
| 5,927,167 A | 7/1999 | Naumann et al. | |
| 7,677,145 B2 | 3/2010 | Grund et al. | |
| 9,617,691 B2 | 4/2017 | Hughes et al. | |
| 9,796,027 B2 | 10/2017 | Francis et al. | |
| 2002/0172567 A1 | 11/2002 | Popke | |
| 2007/0292226 A1 | 12/2007 | Grund et al. | |
| 2009/0136304 A1* | 5/2009 | Satran | B23C 5/202 407/104 |
| 2014/0271012 A1 | 9/2014 | Hughes et al. | |
| 2015/0165528 A1 | 6/2015 | Gremer et al. | |
| 2016/0199997 A1 | 7/2016 | Nishio et al. | |
| 2017/0225244 A1* | 8/2017 | Crespin | B23C 5/06 |
| 2019/0210175 A1 | 7/2019 | Chu et al. | |

* cited by examiner

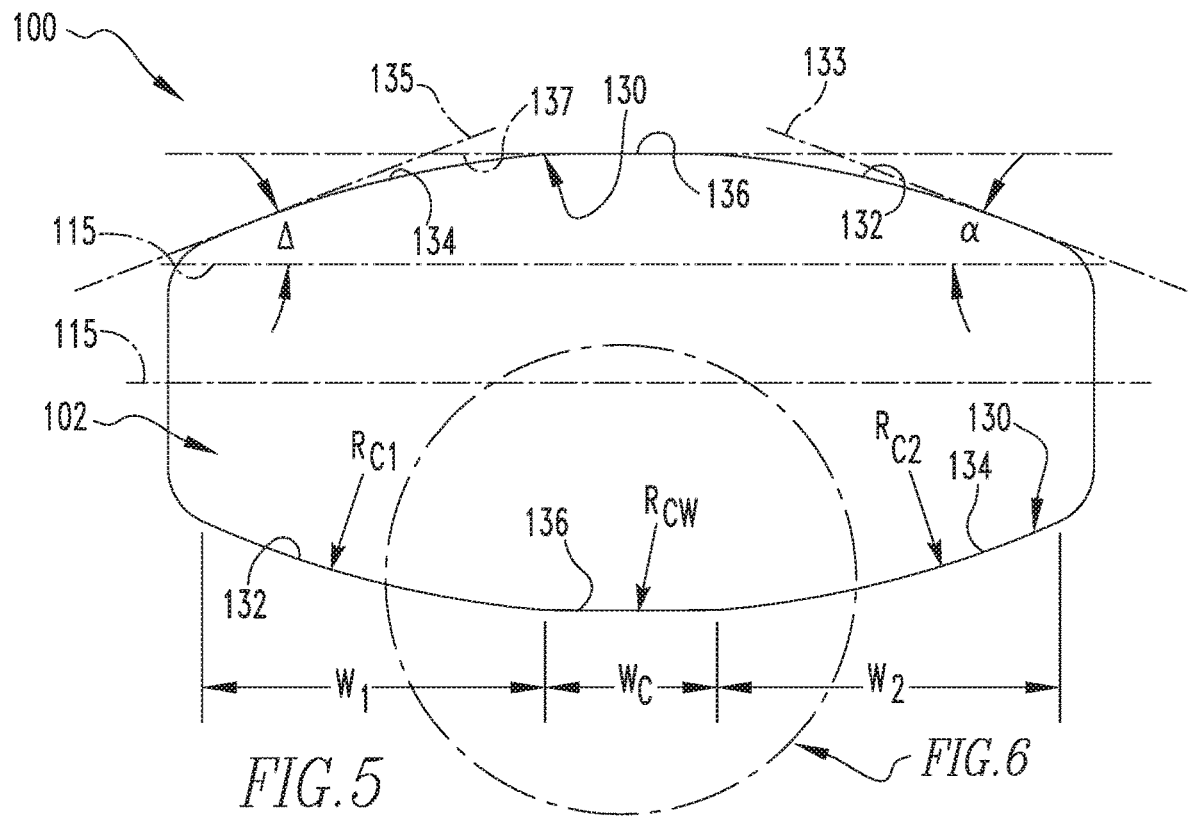
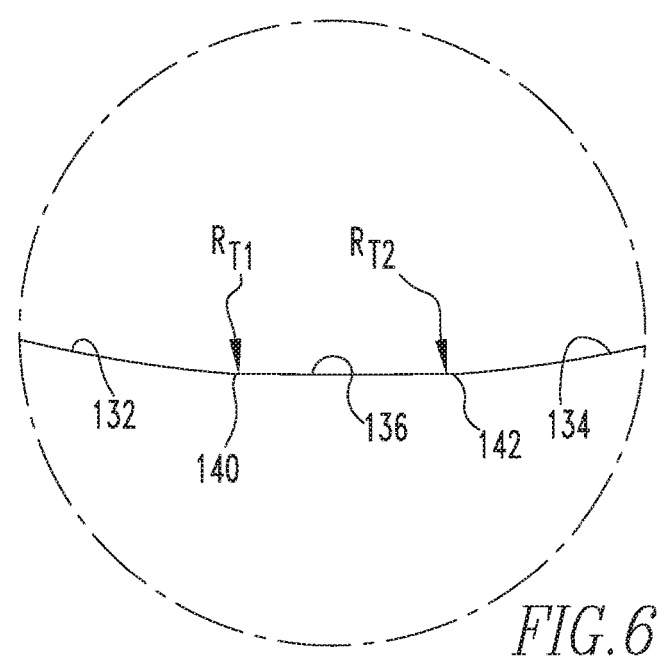
FIG.6

INDEXABLE TANGENTIAL RAILWAY WHEEL MILLING INSERTS AND CUTTING TOOL HOLDERS

FIELD OF THE INVENTION

The present invention relates to cutting tools, including cutting tool holders and cutting inserts. In particular, the present invention relates to indexable and replaceable milling inserts and wheel truing cutters configured to engage and secure the indexable and replaceable milling inserts during railway wheel milling operations.

BACKGROUND INFORMATION

Railway vehicles operate by using railway wheels which are guided and supported by rails affixed to the ground or other structures. Railway wheels are typically part of a wheel set which includes, at a minimum, a pair of wheels, an axle, and bearings. During operation of a railway vehicle (such as locomotives and railroad cars), their wheels become worn due to their contact with the rails upon which they ride. This wear often increases the risk of train derailment and may accelerate wheel wear or otherwise adversely affect the running characteristics of the wheels and railway vehicles. Thus, the wheels should be periodically reprofiled or trued.

The wheels may be reprofiled or trued with stock removal carried out, for example, by a turning or milling process. Thus, for example, peripheral milling machines, which are adapted to remove metal by feeding a workpiece through the periphery of a rotating circular cutter (such as a milling cutter), are often used. In a conventional arrangement, cutting inserts are mechanically secured to a tool holder, and are removable in relation to the tool holder. The milling cutter may have in excess of 100 inserts, with each insert at a different axial location and on its own path. Furthermore, the pockets of the milling cutting may be located at different positions to provide the desired profile of the wheel. Accordingly, the entire profile of the wheel may be cut by each insert cutting its own individual portion of the wheel, i.e., each cutting insert may be 1 effective. In conventional milling cutter designs, the inserts may be round inserts. The pockets of the milling cutters may be structured and arranged to receive the round inserts. During the reprofiling cutting operation, the conventional round inserts may provide an unsatisfactory surface finish. For example, each round cutting insert may leave a visible scallop on the surface of wheel.

SUMMARY OF THE INVENTION

Milling inserts are provided that include at least four indexable cutting edges, each with a central wiper cutting edge segment between two convex cutting edge segments. The milling inserts may allow both the flat and curved portions of a railway wheel to be machined with an improved surface finish. Wheel truing cutters are also provided to engage and secure the indexable milling inserts.

An aspect of the present invention is to provide a tangential railway wheel milling insert comprising a first face, a first pair of opposing side surfaces, a second pair of opposing side surfaces and a corner radius connecting each of the first pair of opposing side surfaces to each of the second pair of opposing side surfaces, a corner edge portion formed at an intersection between the first face and each corner radius, and a cutting edge formed at an intersection between the first face and each of the first pair of opposing side surfaces, each of the cutting edges comprising a first cutting edge segment extending from a first one of the corner edge portions, the first cutting edge segment including a convex portion, a central wiper cutting edge segment extending from the first convex portion, and a second cutting edge segment extending from the central wiper facet portion to a second one of the corner edge portions, the convex cutting edge segment including a convex portion.

Another aspect of the present invention is to provide a railway wheel milling tool system comprising a plurality of tangential railway wheel milling inserts, each milling insert comprising a first face, a second face opposite the first face, a first pair of opposing side surfaces, a second pair of opposing side surfaces and a corner radius connecting each of the first pair of opposing side surfaces to each of the second pair of opposing side surfaces a corner edge portion formed at an intersection between each of the first and second faces and each corner radius, and a cutting edge formed at an intersection between each of the first and second faces and each of the first pair of opposing side surfaces, each of the cutting edges comprising a first cutting edge segment extending from a first one of the corner edge portions, the first cutting edge segment including a convex portion, a central wiper cutting edge segment extending from the first convex portion, and a second cutting edge segment extending from the central wiper facet portion to a second one of the corner edge portions, the convex cutting edge segment including a convex portion, and a railway wheel truing cutter comprising a plurality of insert pockets positioned about a longitudinal axis of the tool holder, each insert pocket comprising a bottom clearance surface, a first sidewall portion extending generally perpendicularly from the bottom clearance surface, a second sidewall portion extending generally perpendicularly from the bottom clearance surface opposite the first sidewall portion, a first alignment wedge extending from the first sidewall portion to the bottom clearance surface, a second alignment wedge extending from the second sidewall portion to the bottom clearance surface.

A further aspect of the present invention is to provide a railway wheel truing cutter comprising a plurality of insert pockets positioned about a longitudinal axis of the tool holder, each insert pocket comprising a bottom clearance surface, a first sidewall portion extending generally perpendicularly from the bottom clearance surface, a second sidewall portion extending generally perpendicularly from the bottom clearance surface opposite the first sidewall portion, a rear seating surface extending generally perpendicularly from the first and second sidewall portions and the bottom clearance surface, a first alignment wedge extending from the first sidewall portion to the bottom clearance surface, a second alignment wedge extending from the second sidewall portion to the bottom clearance surface, and a radially recessed front portion.

These and other aspects of the present invention will be more apparent from the following description.

BRIEF DESCRIPTION OF THE DRAWINGS

FIGS. 4 and 5 are top views of the tangential railway wheel milling insert of FIG. 2.

FIG. 6 is a magnified portion of the tangential railway wheel milling insert as shown in FIG. 5.

DETAILED DESCRIPTION

Figure 1:
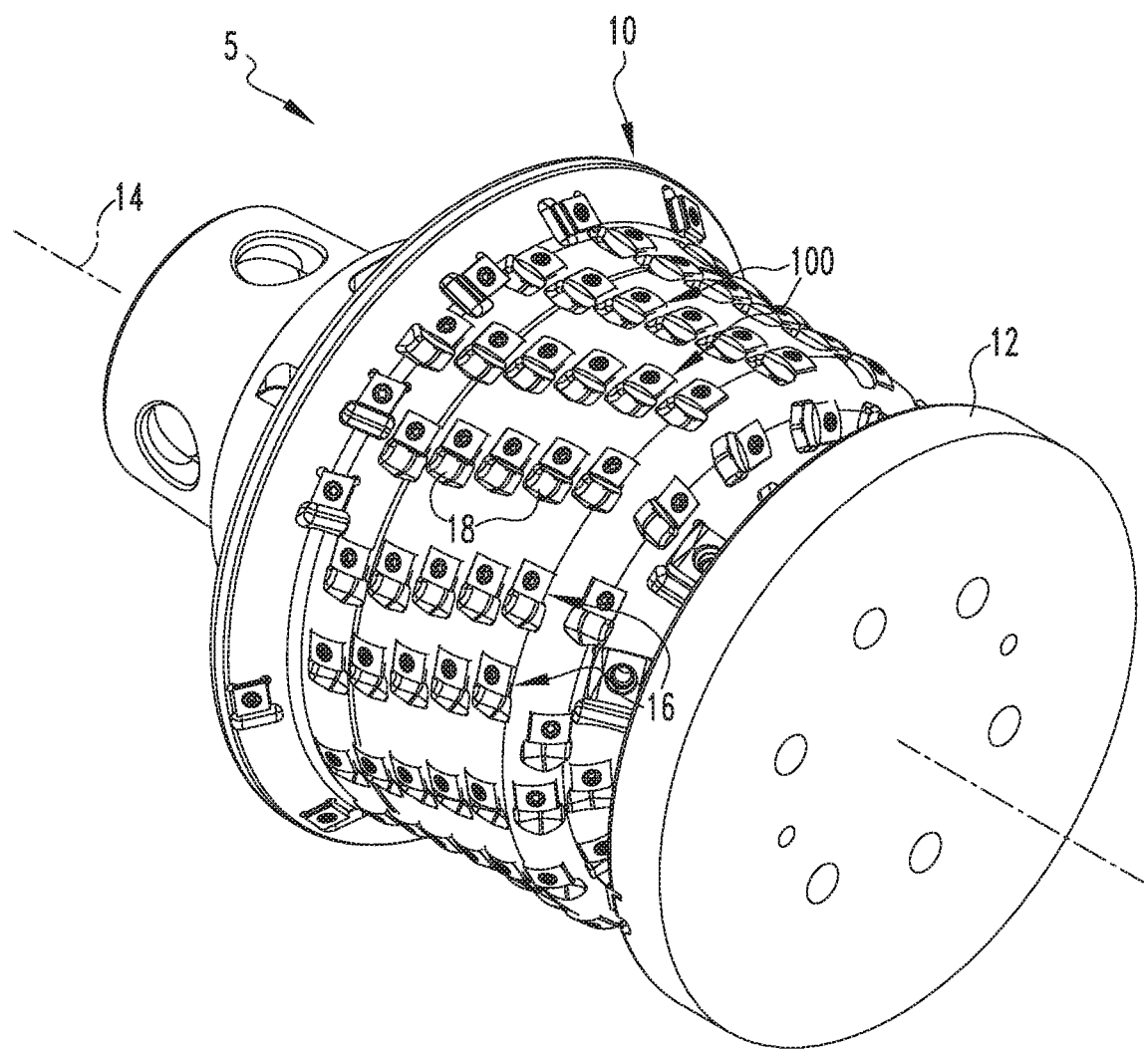
FIG. 1 is an isometric view of a railway wheel milling tool system comprising a wheel truing cutter and a plurality of tangential railway wheel milling inserts in accordance with an embodiment of the present invention.

FIG. 1 illustrates a railway wheel milling tool system 5 in accordance with an embodiment of the present invention. The cutting tool system 5 includes a wheel truing cutter 10 and a plurality of tangential railway wheel milling inserts 100 installed within the wheel truing cutter 10. As more fully described below, the milling inserts are configured to allow both the flat portion and curved portion of a railway wheel to be machined and/or reprofiled with an improved surface finish. The wheel truing cutter 10 has a generally cylindrical body 12 with a rotational axis 14. In accordance with an embodiment of the present invention, the body 12 of the wheel truing cutter 10 includes a plurality of flutes 16 each having a plurality of insert pockets 18 therein. Each insert pocket 18 is structured and arranged to receive a tangential railway wheel milling insert 100 to form a substantially continuous cutting edge on the wheel truing cutter 10, as more fully described below. In the embodiment shown, the body 12 of wheel truing cutter 10 includes sixteen flutes 16, but any other suitable number of flutes may be used. For example, there may be one, five, six, seven, eight, nine, ten, fifteen, twenty, twenty-five or more flutes.

Figure 2:
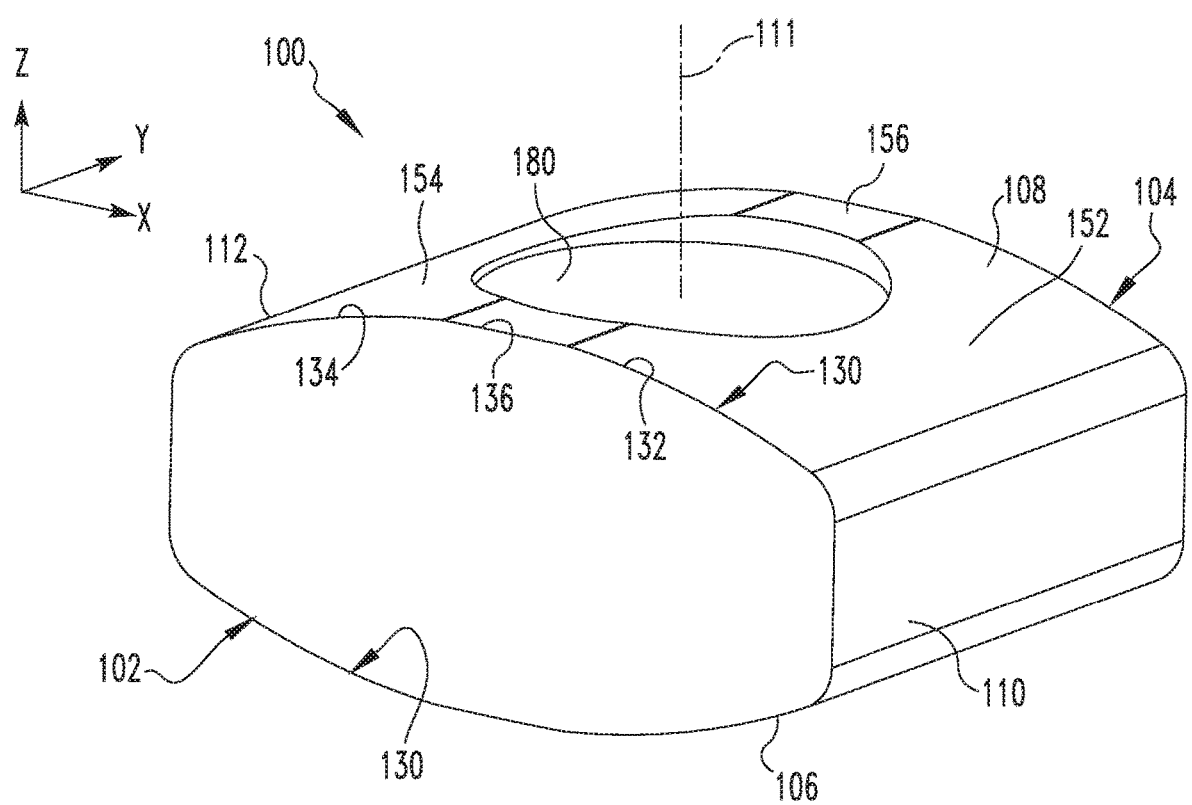
FIG. 2 is an isometric view of a tangential railway wheel milling insert in accordance with an embodiment of the present invention.

FIG. 2 is an isometric view of a double-sided tangential railway wheel milling insert 100 in accordance with an embodiment of the present invention. The milling insert includes a first face 102 and a second face 104 opposite the first face 102, and side surfaces 106, 108, 110, 112. While a generally rectangular milling insert 100 is shown in this embodiment, any other suitable shape of milling insert may be used, e.g., square, diamond, or the like. In accordance with an embodiment of the present invention, the side surfaces 106 and 108 may form a first pair of opposing side surfaces and side surfaces 110 and 112 may form a second pair of opposing side surfaces. The side surfaces 106, 108, 110, 112 and the first and second faces 102 and 104 may serve as seating surfaces when the milling insert 100 is mounted in a cutting tool holder, such as the wheel truing cutter 10 that is shown in FIG. 1 and described below.

As shown in FIGS. 2-5, the milling insert 100 includes a central longitudinal axis 111 that runs in a Z-axis direction and a central plane 115 that extends normal to the central longitudinal axis 111 and normal to the planes of the first and second faces 102 and 104. In accordance with an embodiment of the present invention, the milling insert 100 is a double-sided insert in which the first face 102 is substantially identical to the second face 104. The milling insert 110 is 180-degree rotationally symmetric about the central longitudinal axis 111. Therefore, only the first face 102 may be described below for brevity. As is known in the art, the first face 102 may become the top surface and the second face may become the bottom surface when mounted within a tool holder, and vice versa.

Figure 3:
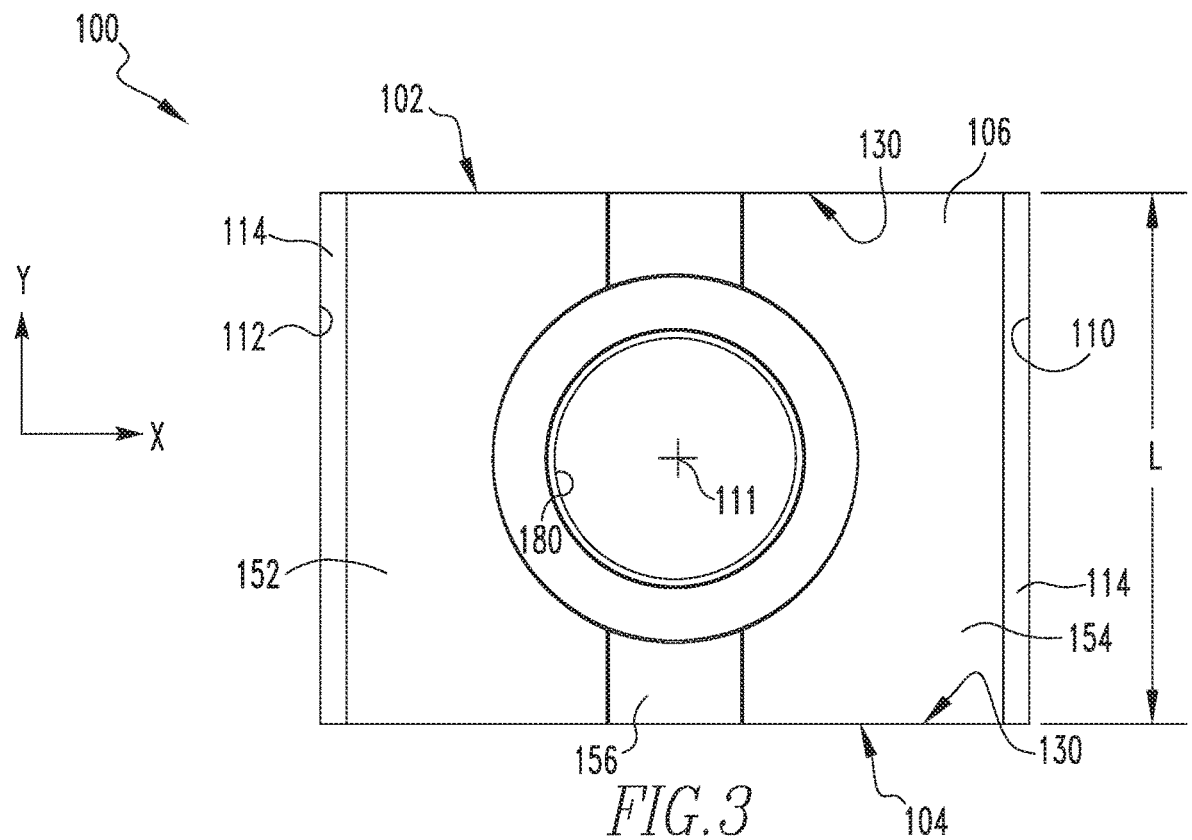
FIG. 3 is a front view of the tangential railway wheel milling insert of FIG. 2.

As shown in FIGS. 2 and 3, the milling insert 100 comprises a mounting through hole 180 extending from the side surface 106 to the side surface 108. The mounting through hole 180 is adapted to receive a fastener for mounting the milling insert 100 in a cutting tool holder, as further described below. As shown in FIG. 3, the mounting through hole 180 is centrally located in the side surfaces 106 and 108 and the central longitudinal axis 111, passes through the center of the mounting through hole 180.

Figure 4:
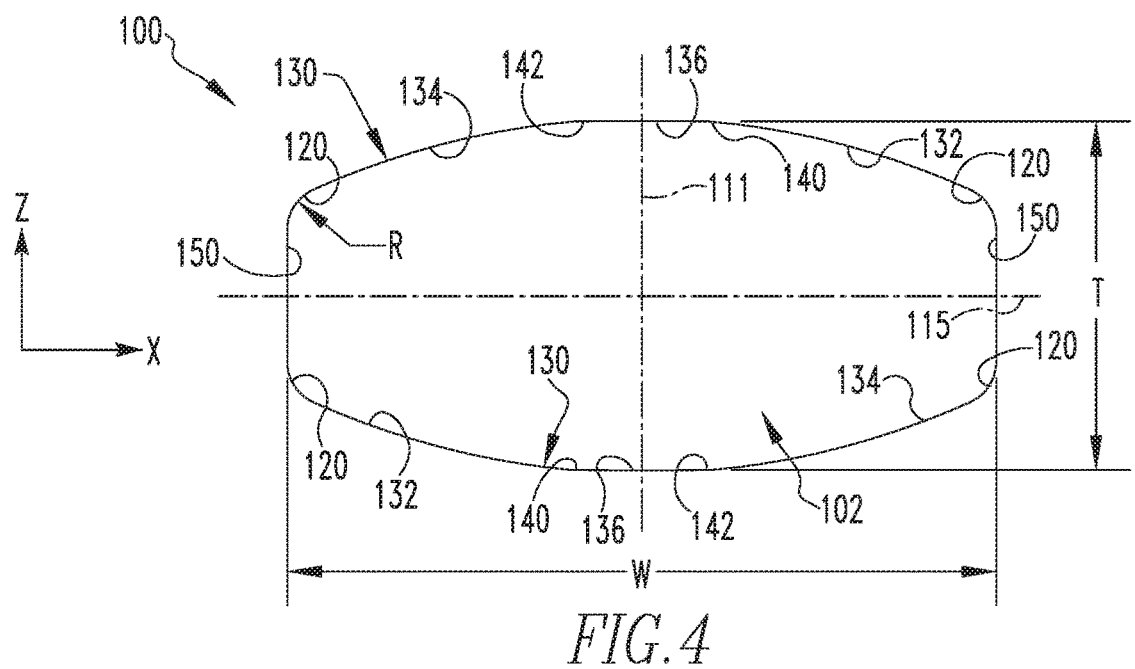

As shown in FIGS. 3 and 4, the milling insert 100 has a total thickness T measured in the Z-direction along the central longitudinal axis 111, a total length L measured in the Y-direction, and a total width W measured in the X-direction. In accordance with an embodiment of the present invention, any suitable total thickness T and total width W of the milling insert 100 may be used. The total width W of the milling insert 100 may be greater than or equal to the total thickness T of the milling insert 100. For example, the ratio of W:T may be from 1:1 to 5:1, for example, from 1.5:1 to 3:1. The total width W of the milling insert may be greater than or equal to the total length L of the milling insert. For example, the ratio of W:L may be from 1:1 to 3:1, for example, from 1.1:1 to 2:1.

As shown in FIGS. 2 and 3, the milling insert 100 comprises four corner radius portions 114 formed between adjacent side surfaces 106, 108, 110, 112. As shown in FIG. 4, the milling insert 100 includes four corner edge portions 120 at the intersection between each corner radius portion 114 and the first face 102. Because the milling insert 100 is 180-degree rotationally symmetric about the central longitudinal axis, it will be understood that the milling insert 100 includes four corner edge portions 120 at the intersection between each corner radius portion 114 and the second face 104. As shown in FIG. 4, each corner edge portion 120 may be formed as rounded segment having a radius R that allows for a connection between adjacent side surfaces. For example, the radius R of each corner edge portion 120 may typically range from 0.4 to 3 mm. In a particular embodiment, the radius R of each corner edge portion 120 may be about 0.8 mm.

In accordance with an embodiment of the present invention, the milling insert 100 comprises four cutting edges 130 formed at the intersections between the side surfaces 106 and 108 and the first and second faces 102 and 104. As shown in FIG. 4, each cutting edge 130 is formed by a first convex cutting edge segment 132, a second convex cutting edge segment 134 and a central wiper cutting edge segment 136 connecting the first convex cutting edge segment 132 to the second convex cutting edge segment 134. In accordance with an embodiment of the present invention, each cutting edge 130 of the indexable milling insert 100 may be formed by identical cutting edge segments. The shape and length of the cutting edge segments 132, 134 and 136 may be selected to provide the railway wheel with an improved surface finish and to allow the same style of milling insert to be mounted within a wheel truing cutter to cut a variety of different profiles.

In accordance with an embodiment of the present invention, the milling insert 100 comprises four minor edges 150 formed at the intersections between the side surfaces 110 and 112 and the first and second faces 102 and 104. The minor edges 150 extend between adjacent corner edge portions 120.

As shown in FIG. 5, the first convex cutting edge segment 132 extends away from a first corner edge portion 120 to the central wiper cutting edge segment 136. In the embodiment shown, the first convex cutting edge segment 132 may have a convex curved portion along its entire length. However, any other suitable shape of cutting edge may be used, e.g., the first convex cutting edge segment may be linear or the like. The first convex cutting edge segment 132 may be formed with a radius, $R_{C1}$, as shown in FIG. 5. For example, the radius $R_{C1}$ may typically range from about 5 to about 50 mm, or from about 7.5 to about 30 mm, or from about 10 to about 20 mm. In a particular embodiment, the radius $R_{C1}$ is about 14.3 mm.

As shown in FIG. 5, the second convex cutting edge segment 134 extends away from the central wiper cutting edge segment 136 to a second corner edge portion 120. In the embodiment shown, the second convex cutting edge segment 134 may have a convex curved portion along its entire length. However, any other suitable shape of cutting edge may be used, e.g., the second convex cutting edge segment may be linear or the like. The second convex cutting edge segment 134 may be formed with a radius, $R_{C2}$, as shown in FIG. 5. For example, the radius $R_{C2}$ may typically range from about 5 to about 50 mm, or from about 7.5 to about 30 mm, or from about 10 to about 20 mm. In a particular embodiment, the radius $R_{C2}$ is about 14.3 mm. In accordance with an embodiment of the present invention, the first convex cutting edge segment radius $R_{C1}$ may be equal to the second convex cutting edge segment radius $R_{C2}$. Alternatively, the first and second wiper edge radii may be different.

As shown in FIG. 5, the central wiper cutting edge segment 136 may extend between the first convex cutting edge segment 132 and the second convex cutting edge segment 134. In the embodiment shown, the central wiper cutting edge segment 136 may have a convex curved portion along its entire length. However, any other suitable shape of cutting edge may be used, e.g., the central wiper cutting edge segment may be linear or the like. The central wiper cutting edge segment 136 may be formed with a radius, $R_{CW}$, as shown in FIG. 5. For example, the radius $R_{CW}$ may typically range from about 10 to about 200 mm, or from about 50 to about 150 mm, or from about 75 to about 125 mm. In a particular embodiment, the radius $R_{CW}$ is about 100 mm. In accordance with an embodiment of the present invention, the central wiper cutting edge segment radius $R_{CW}$ may be larger than the first convex cutting edge segment radius $R_{C1}$ and the second convex cutting edge segment radius $R_{C2}$. The relatively large radius $R_{CW}$ of the central wiper cutting edge segment 136 may provide the railway wheel with an improved surface finish by reducing the scallop left in the flat areas of the railway wheel. The large radius of the $R_{CW}$ of the central wiper cutting edge segment 136 may allow for an improved blend between the steps left in the flat areas of the railway wheel by the plurality of inserts on the wheel truing cutter 10.

In accordance with an embodiment of the present invention, the large central wiper cutting edge segment radius $R_{CW}$ allows the central wiper cutting edge segment 136 of the milling insert 100 to be positioned in the wheel truing cutter 10 to mill the flat tread area of the railway wheel. The smaller first convex cutting edge segment radius $R_{C1}$ and the second convex cutting edge segment radius $R_{C2}$ may allow the milling insert 100 to be positioned in the wheel truing cutter 10 to effectively mill the transition area having a radius between the tread and the flange of the railway wheel. The milling insert 100 allows the same style of insert to be used in a plurality of pockets to perform milling of a railway wheel to provide a profile having both flat and curved areas.

As shown in FIG. 6, each cutting edge 130 of the milling insert 100 may comprise a first transitional blend 140 connecting the first convex cutting edge segment 132 and the central wiper cutting edge segment 136 and a second transitional blend 142 connecting the central wiper cutting edge segment 136 and the second convex cutting edge segment 134. In accordance with an embodiment of the present invention, the first transitional blend 140 may provide transition between the first convex cutting edge segment 132 with the central wiper cutting edge segment 136. The second transitional blend 142 may provide the transition between the central wiper cutting edge segment 136 and the second convex cutting edge segment 134. In accordance with an embodiment of the present invention, the first transitional blend 140 and the second transitional blend 142 may prevent a sharp corner between the central wiper cutting edge segment 136 and the first convex cutting edge segment 132 and the second convex cutting edge segment 134. Alternatively, each cutting edge 130 of the milling insert may be formed without the first transitional blend 140 and the second transitional blend 142.

In accordance with an embodiment of the present invention, the first transitional blend 140 may have a convex curved portion. As shown in FIG. 6, the first transitional blend 140 may be formed with a radius, $R_{T1}$. For example, the radius $R_{T1}$ may typically range from about 0.05 to about 2 mm, or from about 0.1 to about 1 mm, or from about 0.25 to about 0.75 mm. In a particular embodiment, the first transitional blend radius $R_{T1}$ is about 0.5 mm. In accordance with an embodiment of the present invention, the second transitional blend 142 may have a convex curved portion. The second transitional blend 142 may be formed with a radius, $R_{T2}$. For example, the radius $R_{21}$ may typically range from about 0.05 to about 2 mm, or from about 0.1 to about 1 mm, or from about 0.25 to about 0.75 mm. In a particular embodiment, the second transitional blend radius $R_{T2}$ is about 0.5 mm.

As shown in FIG. 5, the first convex cutting edge segment 132 has a width $W_1$, the second convex cutting edge segment 134 has a width $W_2$ and the central wiper cutting edge segment 136 has a length $W_C$. The widths of the plurality of cutting edge segments are selected to provide the desired active cutting edge widths and allow for the rigid clamping of the milling insert 100 in a pocket. In accordance with an embodiment of the present invention, the first convex cutting edge segment width $W_1$ may typically range from 25 to 55 percent of the total width W, or from 30 to 50 percent of the total width W, or from 35 to 45 percent of the total width W of the milling insert 100. In accordance with an embodiment of the present invention, the second convex cutting edge segment width $W_2$ may typically range from 25 to 55 percent of the total width W, or from 30 to 50 percent of the total width W, or from 35 to 45 percent of the total width W of the milling insert 100. In accordance with an embodiment of the present invention, the central wiper cutting edge width $W_C$ may typically range from 5 to 50 percent of the total width W, or from 10 to 40 percent of the total width W, or from 15 to 25 percent of the total width W of the milling insert 100.

In accordance with an embodiment of the present invention, the first convex cutting edge segment width $W_1$ may be equal to the second convex cutting edge segment width $W_2$. Alternatively, the first and second convex cutting edge segment widths may be different. In accordance with an embodiment of the present invention, the first convex cutting edge segment width $W_1$, the second convex cutting edge segment width $W_2$ and the central wiper cutting edge width $W_C$ may be varied depending on the overall width W of the milling insert 100. For example, if the overall width W of the milling insert 100 is increased the first convex cutting edge segment width $W_1$, the second convex cutting edge segment width $W_2$ and the central wiper cutting edge width $W_C$ may increase. Alternatively, if the overall width W of the milling insert 100 is decreased the first convex cutting edge segment width $W_1$, the second convex cutting edge segment width $W_2$ and the central wiper cutting edge width $W_C$ may decrease.

In accordance with an embodiment of the present invention, the orientation of the plurality of cutting edge segments of each cutting edge 130 may be described in relation to the central plane 115. Because the first convex cutting edge segment 132, the second convex cutting edge segment 134 and the central wiper cutting edge segment 136 may be curved along their entire widths, their respective orientation with respect to the central plane 115 may be described by a tangent line, as shown in FIG. 5. As shown in FIG. 5, a line 133 tangent to the first convex cutting edge segment 132 extends away from a first corner edge portion 120 at a first cutting edge angle α with respect to the central plane 115, which in the embodiment shown is a positive angle. For example, the first cutting edge angle α may be greater than about 5 degrees, for example, from 10 to 50 degrees, or from 15 to 40 degrees, or from 20 to 30 degrees. In a particular embodiment, the first cutting edge angle α may be about 24 degrees.

As shown in FIG. 5, a line 135 tangent to the second convex cutting edge segment 134 extends away from the central wiper cutting edge segment 136 toward a second corner edge portion 120 at a second cutting edge angle Δ with respect to the central plane 115, which in the embodiment shown is a negative angle rather than the positive first cutting edge angle α of the first convex cutting edge segment 134. For example, the second cutting edge angle Δ may be greater than about 5 degrees, for example, from 10 to 50 degrees, or from 15 to 40 degrees, or from 20 to 30 degrees. In a particular embodiment, the second cutting edge angle Δ may be about 24 degrees.

As shown in FIG. 5, a line 137 tangent to the central wiper cutting edge segment 136 extends between the first convex cutting edge segment 132 and the second convex cutting edge segment 134 parallel to the central plane 115. Alternatively, the line 137 tangent to the central wiper cutting edge segment 136 may be provided at an angle of from −5 to 5 degrees, or from −2.5 to 2.5 degrees, or from −1 to 1 degree with respect to the central plane 115.

As shown in FIGS. 2, 3 and 4, the side surfaces 106, 108, 110, 112 extend between the first face 102 and the second face 104. As shown in FIGS. 2 and 3, each of the side surfaces 106 and 108 comprise a first mounting surface 152 extending from a first corner radius portion 114, a central mounting surface 156, and a second mounting surface 154 extending from the central mounting surface 156 to a second corner radius portion 114. In the embodiment shown, the first and second mounting surfaces 152 and 154 may have a radius corresponding to the radius of the first and second cutting edge segments 132 and 134. As shown in FIGS. 2 and 3, the central mounting surface 156 may have a radius corresponding to the radius of the central wiper cutting edge segment 136. In accordance with an embodiment of the present invention, the first and second mounting surfaces 152 and 154 may provide abutment surfaces to be engaged in the pocket 18.

The milling inserts 100 may be made of any suitable material, such as tool steels, cemented carbides, and super-hard material, such as cubic boron nitride (CBN), polycrystalline cubic boron nitride (PCBN), polycrystalline diamonds (PCD), tungsten carbide (WC), cermet, ceramic, and the like. The milling inserts 100 of the present invention may be fabricated by any suitable technique, such as carbide powder pressing, grinding or additive manufacturing to provide the plurality of cutting edge segments.

Figure 7:
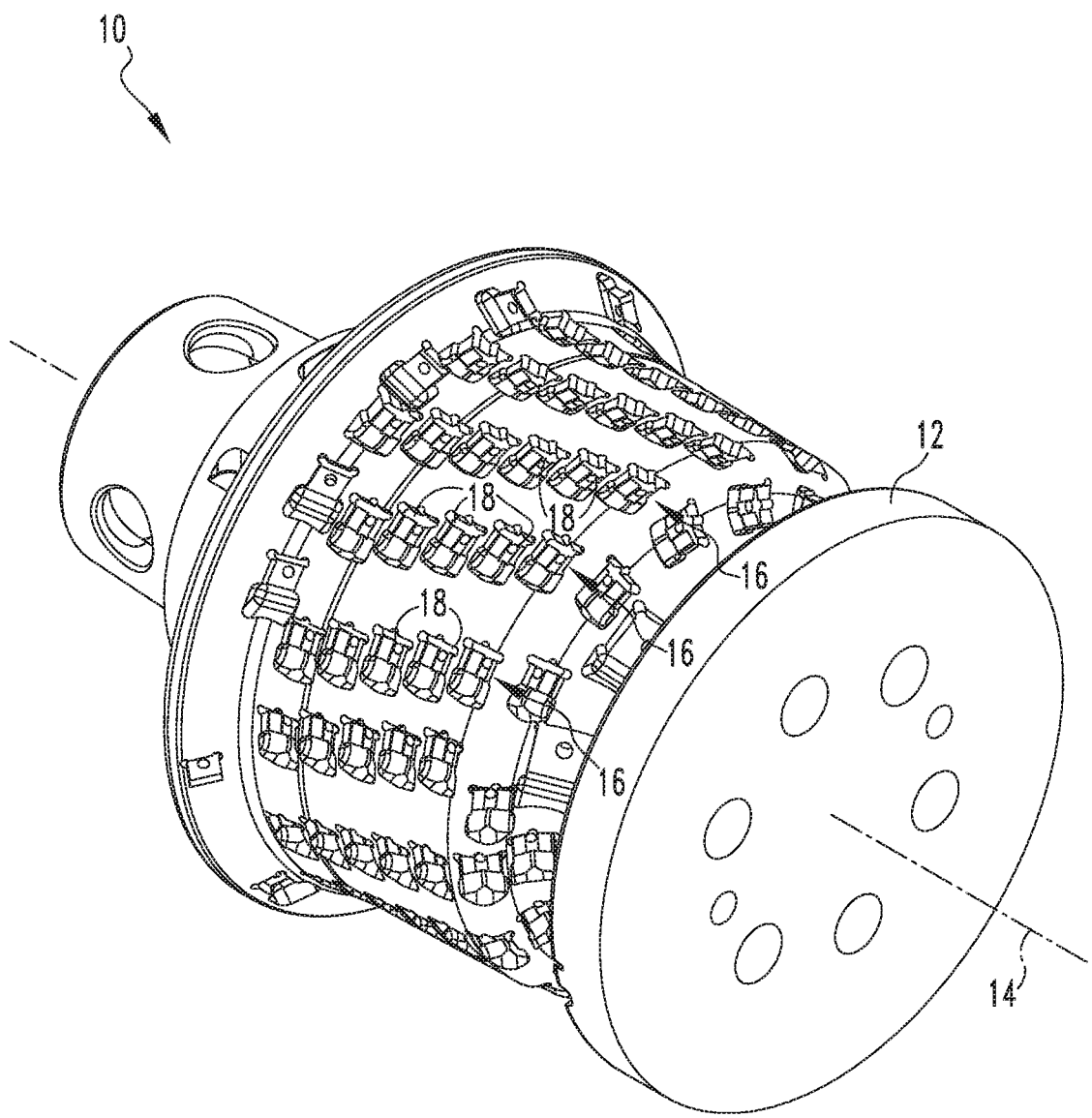
FIG. 7 is an isometric view of a wheel truing cutter in accordance with an embodiment of the present invention.
Figure 10:
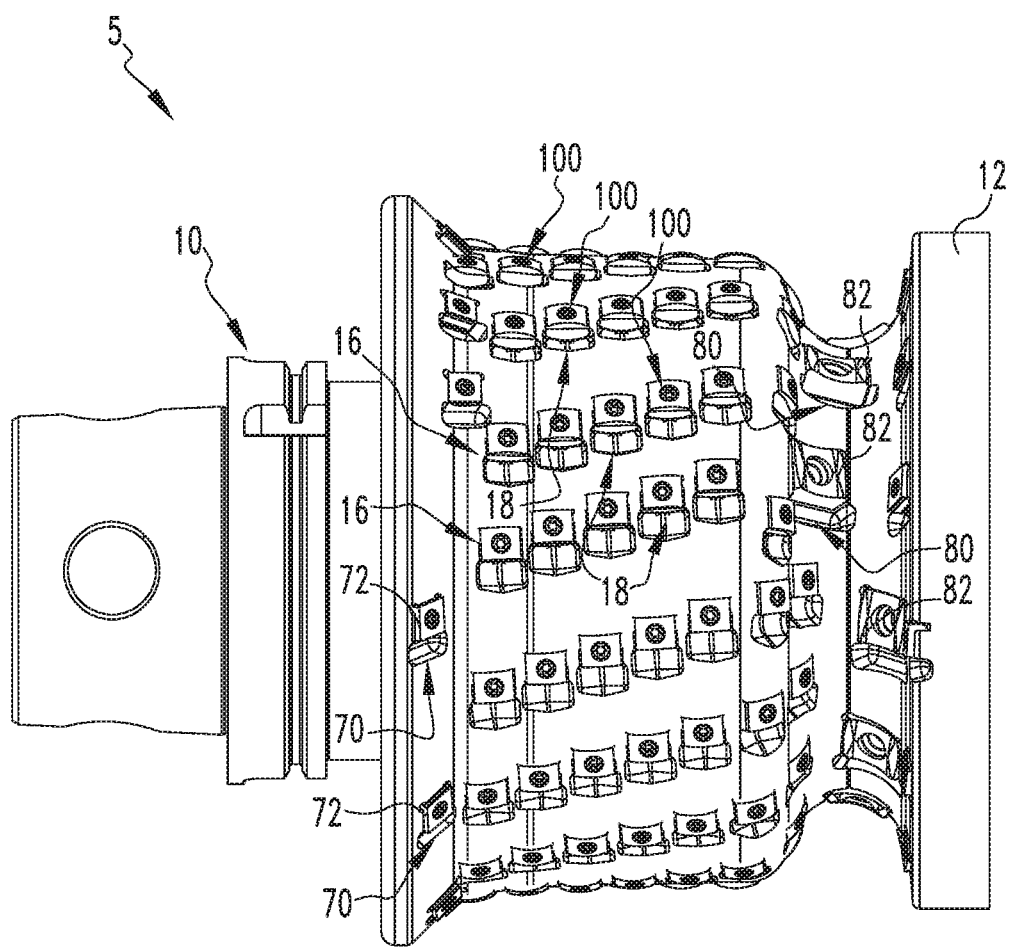
FIG. 10 is a front view of a railway wheel milling tool system comprising wheel truing cutter and a plurality of tangential railway wheel milling inserts in accordance with an embodiment of the present invention.

As shown in FIG. 7, the wheel truing cutter 10 comprises a plurality of insert pockets 18 positioned axially about a longitudinal axis 14. In certain embodiments, the plurality of insert pockets 18 may be positioned in a helical orientation about the longitudinal axis 14. As shown in FIG. 10, the railway wheel milling tool system 5 comprises milling inserts 100 removably secured in each insert pocket 18. In the embodiment shown, the wheel truing cutter 10 may also include insert pockets 70 and 80. Insert pockets 70 and 80 may be structured and arranged to receive different shaped and sized milling inserts. For example, the insert pockets 70 may be structured and arranged to receive smaller milling inserts 72 to perform milling of the outer chamfer of a railway wheel and the insert pockets 80 may be structured and arranged to receive larger milling inserts 82 to perform milling of the flange of a railway wheel, as shown in FIG. 10. Alternatively, the wheel truing cutter 10 may be provided with insert pockets 18 structured and arranged to receive milling inserts 100 to perform milling of the outer chamfer and/or the flange of the railway wheel.

Figure 8:
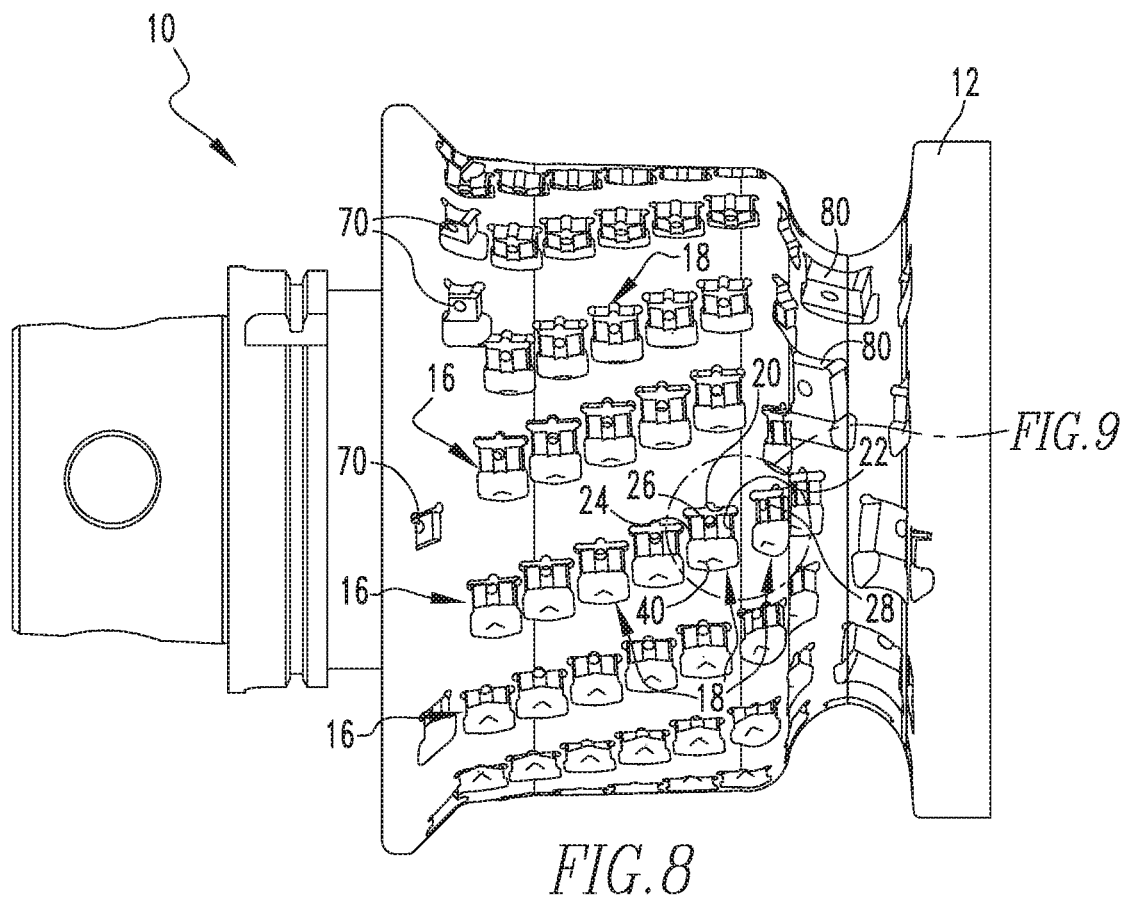
FIG. 8 is a front view of the wheel truing cutter of FIG. 7.
Figure 9:
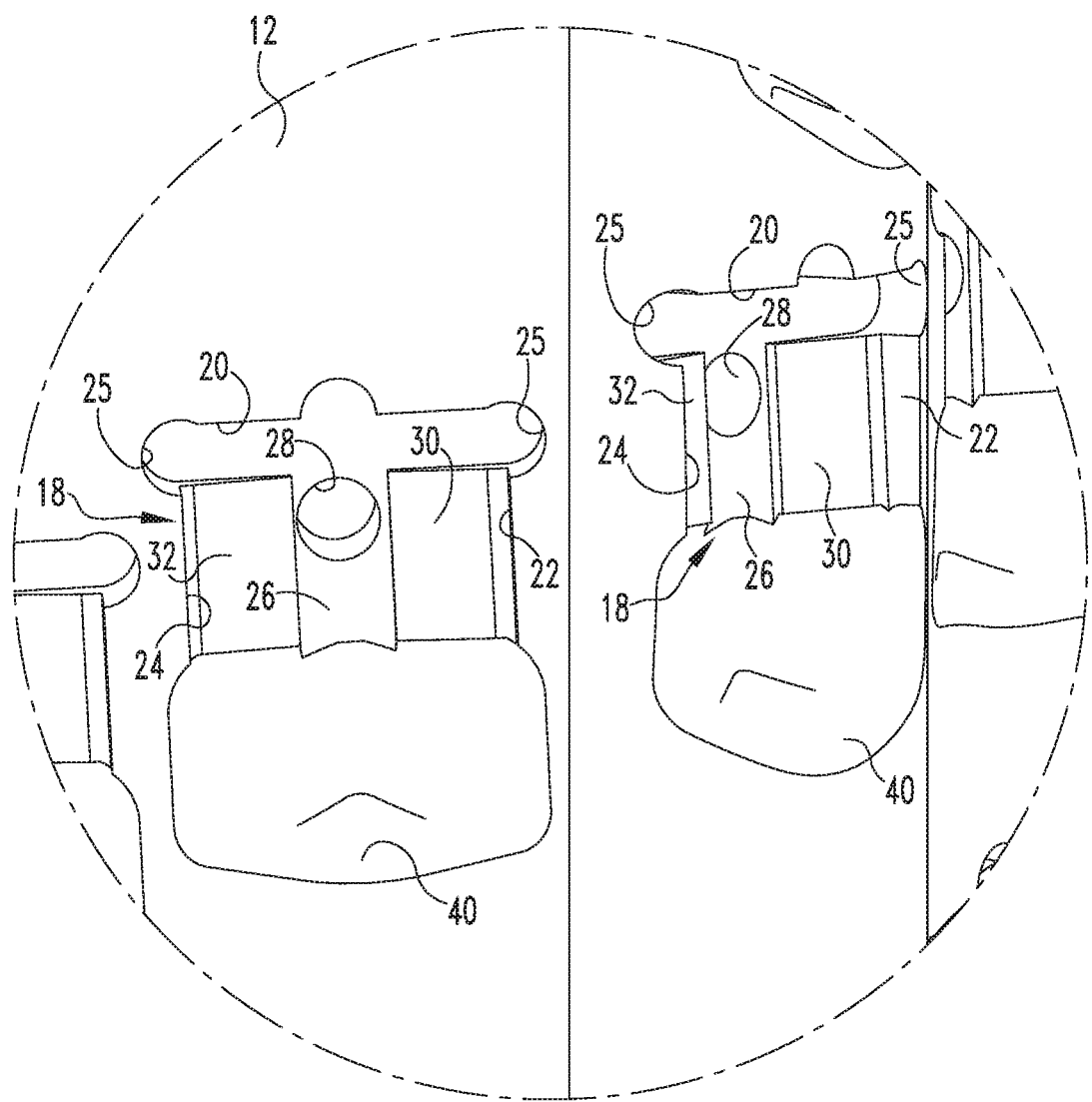
FIG. 9 is a magnified portion of the wheel truing cutter as shown in FIG. 8.

As shown in FIGS. 8 and 9, each insert pocket 18 comprises a rear surface 20, a first sidewall portion 22 extending perpendicularly forward from the rear surface 20 and a second sidewall portion 24 extending perpendicularly forward from the rear surface 20. While a generally square insert pockets 18 are shown in this embodiment, any other suitable shape of insert pockets may be used, e.g., rectangular, triangular or the like.

As shown in FIGS. 9 and 10, the rear surface 20 may be configured to engage with the first face 102 and the second face 104 of the milling insert 100, the first sidewall portion 22 and the second sidewall portion 24 may be configured to engage or accommodate the side surfaces 110 and 112. As used herein, the terms "engage", "engages", and "engagement" and "engaging" mean that two or more features interact with each other to restrict relative movement between the milling insert 100 and the insert pocket 18. In certain embodiments, only one of the side surfaces 110 and 112 may engage with either the first and second sidewall portions 22 and 24. For example, if the side surface 110 engages the first sidewall portion 22, the side surface 112 may be spaced from the second sidewall portion 24 to provide a clearance therebetween. In accordance with an embodiment of the present invention, each insert pocket 18 comprises a bottom clearance surface 26 perpendicular to the rear surface 20 and the first and second sidewall portions 22 and 24. The bottom clearance surface 26 may be configured to accommodate and receive the central mounting surface 156 of the milling insert 100. The bottom clearance surface may prevent the central mounting surface 156 and the inner portions of the first and second mounting surfaces 152 and 154 from contacting the pocket 18. As shown in FIGS. 8 and 9, the bottom clearance surface 26 includes a threaded mounting hole 28 that may be configured to receive a mechanical fastener (not shown) to secure the milling insert 100 in the insert pocket.

As shown in FIGS. 8 and 9, each insert pocket 18 may comprise a first alignment wedge 30 extending from the first sidewall portion 22 to the bottom clearance surface 26 and a second alignment wedge 32 extending from the second sidewall portion 24 to the bottom clearance surface 26. In accordance with an embodiment of the present invention, the first and second alignment wedges 30 and 32 may engage the first and second mounting surfaces 152 and 154 of the milling insert 104. In accordance with an embodiment of the present invention, the first and second alignment wedges 30 and 32 may each have a taper angle that may be selected to position the milling insert 100 in each insert pocket 18.

As shown in FIG. 9, the first alignment wedge 30 may taper radially outwards as it extends from the bottom clearance surface 26 to the first sidewall portion 22 and the second alignment wedge 32 may taper radially outwards as it extends from the bottom clearance surface 26 to the second sidewall portion 24. The first and second alignment wedges 30 and 32 may provide line contact between the pocket 18 and the curved first and second mounting surfaces 152 and 154 of the milling insert 100. The first and second alignment wedges 30 and 32 may help form the cutting edges of the wheel truing cutter 10. For example, the first and second alignment wedges 30 and 32 of the insert pockets 18 located along the flat tread milling portion of the wheel truing cutter 10 may have a taper angle selected to allow the central wiper cutting edge segment 136 of milling insert 100 to be the active cutting portion of the milling insert 100. Alternatively, the insert pockets 18 located at the transition area of the wheel truing cutter 10 may have a taper angle selected to allow the first convex cutting edge segment 132 or the second convex cutting edge segment 134 of milling insert 100 to be the active cutting portion of the milling insert 100. The first and second alignment wedges 30 and 32 may allow a plurality of milling inserts 100 having an identical size and shape to cut a variety of different profiles. In accordance with an embodiment of the present invention, each portion of each insert pocket 18 of the wheel truing cutter 10 may be selected and positioned to provide the desired rake angle, clearance and/or helix for each milling insert 100.

As shown in FIG. 9, each insert pocket 18 may include recessed channels 25 in the corners between the rear surface 20 and the first and second sidewall portions 22 and 24. The recessed channels 25 provide an interference clearance for the insert pockets 18 to receive the milling inserts 100. In accordance with an embodiment of the present invention, any suitable size or shape of insert pocket 18 may be used to engage any shape or size of tangential milling insert 100.

In accordance with an embodiment of the present invention, each insert pocket 18 includes a radially recessed front portion 40 configured to allow cut chips to exit the machining operation. In accordance with an embodiment of the present invention, the depth and shape of the radially recessed front portion 40 may be varied depending on the size and shape of the cutting edge 130 of the milling insert 100. A larger radially recessed front portion 40 may allow chips to be more easily removed from the wheel truing cutter 10. A smaller radially recessed front portion 40 may allow for more insert pockets 18 to be provided in each flute 16 of the wheel truing cutter 10. Increasing the number of insert pockets 18 in each flute 16 may allow for an increased feed rate and a reduced cut time. In the embodiment shown, each insert pocket 18 may have an individual radially recessed front portion 40, however, any other suitable arrangement may be used, e.g., a single radially recessed front portion may extend along the entire length of each flute 16 or the like.

The wheel truing cutter 10 may be made of any suitable material, such as steel, aluminum, titanium or any other material having sufficient strength. The wheel truing cutter 10 of the present invention may be fabricated by any suitable technique, such as machining and/or additive manufacturing to provide the insert pockets and flutes.

As used herein, "including," "containing" and like terms are understood in the context of this application to be synonymous with "comprising" and are therefore open-ended and do not exclude the presence of additional undescribed or unrecited elements, materials, phases or method steps. As used herein, "consisting of" is understood in the context of this application to exclude the presence of any unspecified element, material, phase or method step. As used herein, "consisting essentially of" is understood in the context of this application to include the specified elements, materials, phases, or method steps, where applicable, and to also include any unspecified elements, materials, phases, or method steps that do not materially affect the basic or novel characteristics of the invention.

For purposes of the description above, it is to be understood that the invention may assume various alternative variations and step sequences except where expressly specified to the contrary. Moreover, all numbers expressing, for example, quantities of ingredients used in the specification and claims, are to be understood as being modified in all instances by the term "about". Accordingly, unless indicated to the contrary, the numerical parameters set forth are approximations that may vary depending upon the desired properties to be obtained by the present invention. At the very least, and not as an attempt to limit the application of the doctrine of equivalents, each numerical parameter should at least be construed in light of the number of reported significant digits and by applying ordinary rounding techniques.

It should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

In this application, the use of the singular includes the plural and plural encompasses singular, unless specifically stated otherwise. In addition, in this application, the use of "or" means "and/or" unless specifically stated otherwise, even though "and/or" may be explicitly used in certain instances. In this application, the articles "a," "an," and "the" include plural referents unless expressly and unequivocally limited to one referent.

Whereas particular embodiments of this invention have been described above for purposes of illustration, it will be evident to those skilled in the art that numerous variations of the details of the present invention may be made without departing from the invention as defined in the appended claims.

What is claimed is:

1. A tangential railway wheel milling insert comprising:
a first face, a first pair of opposing side surfaces, a second pair of opposing side surfaces and a corner radius connecting each of the first pair of opposing side surfaces to each of the second pair of opposing side surfaces;
a corner edge portion formed at an intersection between the first face and each corner radius; and a cutting edge formed at an intersection between the first face and each of the first pair of opposing side surfaces, each of the cutting edges comprising:
  a first cutting edge segment extending from a first one of the corner edge portions, the first cutting edge segment including a convex portion;
  a central wiper cutting edge segment extending from the first cutting edge segment, the central wiper cutting edge segment comprising a convex portion; and
  a second cutting edge segment extending from the central wiper cutting edge segment to a second one of the corner edge portions, the second cutting edge segment including a convex portion, and
  wherein the radius of the convex portion of the central wiper cutting edge segment is greater than a radius of the convex portion of the first cutting edge segment and a radius of the convex portions of the second cutting edge segment.

2. The tangential railway wheel milling insert of claim 1, wherein each of the convex portions of the central wiper cutting edge segments include a radius ranging from 10 millimeters to 200 millimeters.

3. The tangential railway wheel milling insert of claim 1, wherein each of the convex portions of the first cutting edge segments include a radius ranging from 5 millimeters to 50 millimeters, and wherein each of the convex portions of the second cutting edge segments include a radius ranging from 5 millimeters to 50 millimeters.

4. The tangential railway wheel milling insert of claim 3, wherein the radius of each of the convex portions of the first cutting edge segments is equal to the radius of each of the convex portions of the second cutting edge segments.

5. The tangential railway wheel milling insert of claim 1, further comprising a mounting through hole extending through the first pair of opposing side surfaces, the center of the mounting through hole defining a central longitudinal axis.

6. The tangential railway wheel milling insert of claim 5, wherein the milling insert comprises a central plane perpendicular to the central longitudinal axis and perpendicular to the first face.

7. The tangential railway wheel milling insert of claim 6, wherein each of the first cutting edge segments extend from the first one of the corner edge portions to the central wiper edge segment at a first cutting edge angle with respect to the central plane, and each of the second cutting edge segments extend from the central wiper cutting edge segment to the second one of the corner edge portions at a second cutting edge angle with respect to the central plane.

8. The tangential railway wheel milling insert of claim 7, wherein the first cutting edge angle is from 1 to 30 degrees and the second cutting edge angle is from 1 to 30 degrees.

9. The tangential railway wheel milling insert of claim 6, wherein each of the central wiper cutting edge segments extend from the first cutting edge segment to the second cutting edge segment parallel to the central plane.

10. The tangential railway wheel milling insert of claim 6, wherein each of the central wiper cutting edge segments have a width less than a width of each of the first cutting edge segments and a width of each of the second cutting edge segments.

11. The tangential railway wheel milling insert of claim 1, wherein each of the cutting edges further comprises a first transitional blend connecting the first convex cutting edge segment and the central wiper cutting edge segment, and a second transitional blend connecting the central wiper cutting edge segment and the second convex cutting edge segment.

12. The tangential railway wheel milling insert of claim 11, wherein the first transitional blend includes a convex portion comprising a radius ranging from 0.05 millimeters to 2 millimeters, and the second transitional blend includes a convex portion comprising a radius ranging from 0.05 millimeters to 2 millimeters.

13. The tangential railway wheel milling insert of claim 1, further comprising a second face opposite the first face and a cutting edge formed at the intersection between the second face and each of the first pair of opposing side surfaces, each of the cutting edges comprising:
  a first cutting edge segment extending from a first one of the corner edge portions, the first cutting edge segment including a convex portion;
  a central wiper cutting edge segment extending from the first convex portion; and
  a second cutting edge segment extending from the central wiper facet portion to a second one of the corner edge portions, the second cutting edge segment including a convex portion.

14. The tangential railway wheel milling insert of claim 13, wherein the first and second faces are 180-degree rotationally symmetric about a central longitudinal axis.

15. A railway wheel milling tool system comprising:
  a plurality of tangential railway wheel milling inserts, each milling insert comprising:
    a first face, a second face opposite the first face, a first pair of opposing side surfaces, a second pair of opposing side surfaces and a corner radius connecting each of the first pair of opposing side surfaces to each of the second pair of opposing side surfaces;
    a corner edge portion formed at an intersection between each of the first and second faces and each corner radius; and
    a cutting edge formed at an intersection between each of the first and second faces and each of the first pair of opposing side surfaces, each of the cutting edges comprising:
      a first cutting edge segment extending from a first one of the corner edge portions, the first cutting edge segment including a convex portion;
      a central wiper cutting edge segment extending from the first cutting edge segment, the central wiper cutting edge segment comprising a convex portion; and
      a second cutting edge segment extending from the central wiper cutting edge segment to a second one of the corner edge portions, the second cutting edge segment including a convex portion, and
      wherein the radius of the convex portion of the central wiper cutting edge segment is greater than a radius of the convex portion of the first cutting edge segment and a radius of the convex portions of the second cutting edge segment; and
      a second cutting edge segment extending from the central wiper cutting edge segment to a second one of the corner edge portions, the second cutting edge segment including a convex portion; and
        a railway wheel truing cutter comprising a plurality of insert pockets positioned about a longitudinal axis of the tool holder, each insert pocket comprising:
          a bottom clearance surface;

a first sidewall portion extending generally perpendicularly from the bottom clearance surface;

a second sidewall portion extending generally perpendicularly from the bottom clearance surface opposite the first sidewall portion;

a first alignment wedge extending from the first sidewall portion to the bottom clearance surface; and a second alignment wedge extending from the second sidewall portion to the bottom clearance surface.

16. A railway wheel truing cutter comprising:

a plurality of insert pockets positioned about a longitudinal axis of the tool holder, each insert pocket comprising:

a bottom clearance surface;

a first sidewall portion extending generally perpendicularly from the bottom clearance surface;

a second sidewall portion extending generally perpendicularly from the bottom clearance surface opposite the first sidewall portion;

a rear seating surface extending generally perpendicularly from the first and second sidewall portions and the bottom clearance surface;

a first alignment wedge extending from the first sidewall portion to the bottom clearance surface, the first alignment wedge comprising a first taper angle;

a second alignment wedge extending from the second sidewall portion to the bottom clearance surface, the second alignment wedge comprising a second taper angle; and a radially recessed front portion, wherein the first taper angle is greater than or less than the second taper angle.

* * * * *